Patented June 21, 1932

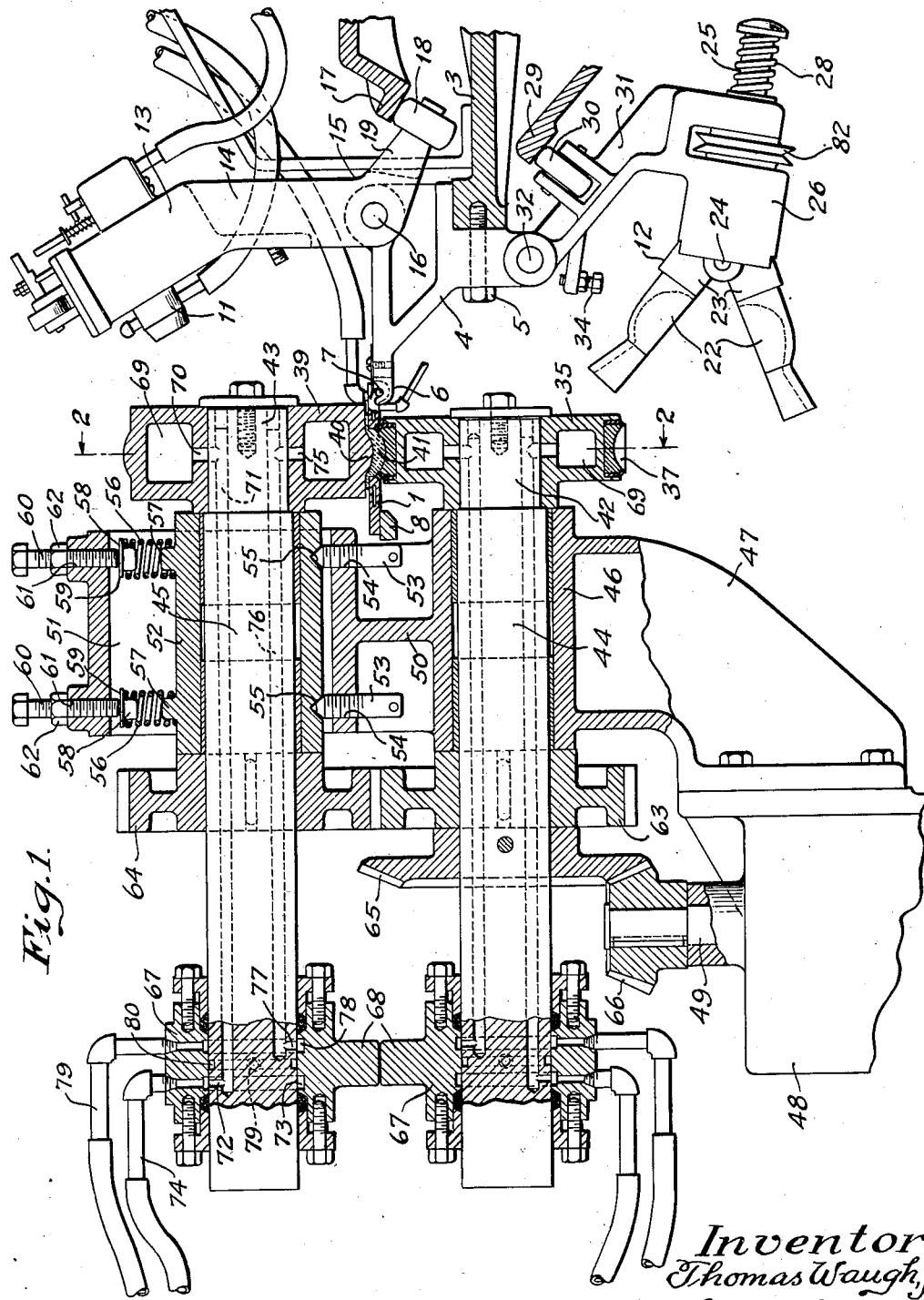

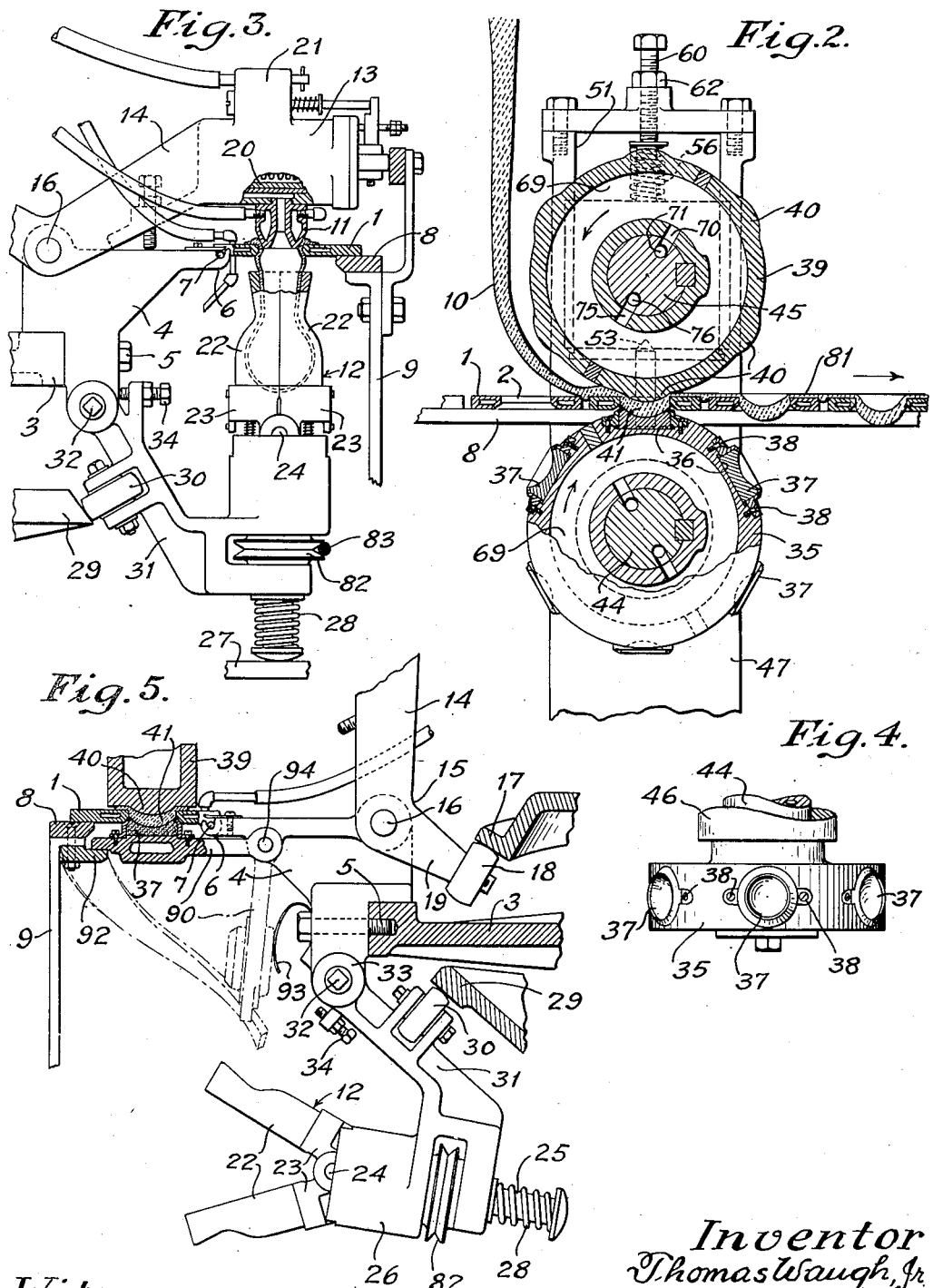

1,863,915

UNITED STATES PATENT OFFICE

THOMAS WAUGH, JR., OF HARTFORD, CONNECTICUT, ASSIGNOR TO HARTFORD-EMPIRE COMPANY, OF HARTFORD, CONNECTICUT, A CORPORATION OF DELAWARE

MANUFACTURE OF BLOWN GLASSWARE

Application filed April 28, 1928. Serial No. 273,587.

This invention relates to the manufacture of blown glassware and it has particular relation to the manufacture of electric lamp bulbs, lamp chimneys, tumblers and the like from glass delivered in a continuous stream from the feeding outlet of an automatic glass feeding device.

The general object of the invention is to provide an improved method and an improved machine for making blown glassware according to the system by which each article is blown in a mold while the glass in the mold is still attached to the parent body of molten glass from which it was derived.

The present invention has particular relation to the system of glass manufacture which contemplates the deposit of a ribbon or strip of glass upon a rotary support having orifices through which the glass to form the articles is caused to descend. A machine for carrying out this system of glass manufacture is illustrated, described and claimed in the copending application of Robert W. Canfield, filed March 21, 1927, Serial No. 176,988. Such machine includes a rotary table which carries a series of apertured plates, termed orifice plates, these plates being arranged side by side around the edge of the rotating table and thus forming a practically continuous support for the strip of glass.

The rotary table also carries a convenient number of blow heads above the level at which the ribbon or strip of glass is deposited upon the orifice plates and a like number of blow molds below the level at which the glass is received. Such machine also includes means arranged to overhang the table between the feeding outlet of the glass feeder and the level at which the stream of glass from the feeding outlet is deposited on the orifice plates for shaping the stream of glass into a succession of relatively thick and rounded sections, which later form parisons for the articles to be made, connected by relatively thin and flat sections which are ultimately discarded as cullet. The relatively thick and rounded sections of the stream of glass are deposited over the orifices of the orifice plates and each is allowed to remain there for a short time so as to sag down somewhat through the orifice and form a parison. The machine includes various devices for insuring accuracy in operation and for synchronizing the operations of the various parts so that the different steps of a cycle of operations for forming a finished article occur in the proper order and at the proper times. After the glass has sagged down somewhat through the orifice of an orifice plate, the blowhead that is associated with such orifice plate descends over the latter and delivers a regulated quantity of air through the orifice into the glass. This air, together with the sagging of the glass due to gravity, expands and elongates the parison to an extent preferably controlled by the action of upwardly directed flames over which the parison passes at this time. When the parison is in proper shape for final blowing, the associated blow mold, which is made of cooperative sections, rises and closes around the parison and finish blowing air is delivered by the blow head through the orifice in the orifice plate. When the blowing is completed, the blowhead rises, the blow mold opens and descends, the finished article is detached from its parent strip and the waste glass is removed as cullet. A glass article thus is completely fabricated while it is still connected to the original body of molten glass from which it was derived.

An object of the present invention is to provide improved mechanism for forming parisons from portions of a ribbon or strip of glass that is being fed from the feeding outlet of a glass feeder to the orifice plates of a machine of the type disclosed in the aforesaid application of Robert W. Canfield, such improved parison forming mechanism being adapted for use in lieu of the means disclosed in the aforesaid Canfield application for imparting a preliminary configuration to the glass stream and, when so used, to cooperate with the various remaining mechanisms and parts of the machine, so that the glass fabricating instrumentalities of such machine are in almost continuous operation and will function to form the articles of glassware in a highly efficient manner.

A more specific object of the present invention is to provide in a machine of the character above described improved mechanism for forming the glass that is to be made into blown glassware into parisons while such glass is supported by the orifice plates in position to descend through the orifices of such plates.

Other objects and advantages of the present invention will be apparent from the following description, when considered in conjunction with the accompanying drawings, in which:

Figure 1 is a view, partly in side elevation and partly in vertical longitudinal section, of improved parison forming mechanism embodying the present invention in association with glass fabricating devices of a shaping machine of the type above described;

Fig. 2 is a vertical transverse section substantially along the line 2—2 of Fig. 1;

Fig. 3 is a fragmentary view, mainly in side elevation and partly in vertical section, illustrating mechanism for fabricating into a finally blown article a parison formed by the improved parison forming means;

Fig. 4 is a plan view of the blank mold carrying member of the structure shown in Figs. 1 and 2; and Fig. 5 is a fragmentary view similar to Fig. 1, showing a modified form of parison forming mechanism that the present invention may provide.

A practical embodiment of the present invention may be applied to a machine having a series of plates 1 each formed with an orifice 2 therein. The orifice plates 1 are arranged in a series around the edge of a rotary support 3, which is shown only partially in the drawings. This rotary support may be a table supported and rotated continuously in any suitable manner, as by the particular means which are disclosed in the aforesaid application, Serial No. 176,988, of Robert W. Canfield. Such table is provided with a radially extending bracket 4 for each orifice plate, each bracket being detachably secured to the periphery of the table by suitable fastening means, such as screw 5 (Figs. 1 and 5). Each bracket is provided at its outer end with suitable bearings 6 which support a hinge pin 7. The orifice plate 1 for each bracket is mounted for vertical swinging movement on the hinge pin 7. The outer end of each orifice plate 1 rests on a track 8 which is suitably supported, as by vertical uprights such as indicated at 9 in Figs. 3 and 5. The outer end portion of the orifice plate 1 slides on the track 8 as the table 3 rotates about its axis, and the track 8 is suitably shaped to maintain each orifice plate 1 in horizontal position as such orifice plate is brought to position to receive a ribbon or stream 10 of glass from an overhead feeding outlet (not shown). Each of the orifice plates is provided with an internal passageway through which cooling fluid may be circulated, all as disclosed in the aforesaid Canfield application.

A blowhead 11 is pivotally mounted on the bracket 4 above the orifice plate thereon and a blow mold 12 is pivotally mounted on the bracket 4 below the level of the orifice plate. The blowhead 11 may be carried by a fluid pressure cylinder 13 which is formed on an arm 14 of a bell crank lever 15. The bell crank lever is pivotally mounted for vertical swinging movement on a stud 16 which is carried by the bracket 4. The blowhead is raised and lowered at the proper times into and out of operative relation with its associated orifice plate 1 by a cam 17 which is supported above the table 3 and is engaged by a roller 18 on the other arm 19 of the bell crank lever 15. The cylinder 13 has a piston 20 reciprocable therein (see Fig. 3) for controlling the delivery of a predetermined volume of initial blowing air through the blowhead 11 when the blowhead is in its operative position with respect to the associate orifice plate. The cylinder 13 also is provided with a valve 21 for controlling the delivery through the cylinder to the blowhead of finish blowing air. The construction of the cylinder and piston, of the valve 21, and of the timing and operating mechanism for these parts preferably is substantially as disclosed in the copending application of Robert W. Canfield, Serial No. 176,988, aforesaid. The blowhead and the blowhead supporting and operating structure preferably are cooled by suitable means which may be as disclosed in said copending application.

Each blow mold 12 may comprise two halves or sections 22 carried by suitable holders 23. The holders 23 are mounted upon a pivot element 24 for swinging movement about a horizontal axis. A rod 25 is adapted to act through connected mechanism located within a sleeve or housing 26 to close the blow mold at the proper time, which is determined by the coaction of the rod 25 with a cam 27 (Fig. 3) and to effect opening of the mold under the influence of a spring 28 when the relation of the rod 25 with the cam 27 will permit. The mold is raised and lowered at the proper times into and out of operative relation with its associated orifice plate 1 by means of a cam 29 with which a roller 30 on an arm 31 of the blow mold supporting structure contacts. The arm 31 is pivotally mounted upon a stud 32 which is carried by a bearing 33 formed on the lower part of the bracket 4. A stop screw 34 is threaded into a lug on the arm 31 for engagement with the bracket 4 when the blow mold is in its raised position, and the stop screw may be adjusted to vary the limit of the upward movement of the blow mold.

The blow mold and its supporting and operating structure, may be substantially as disclosed in the aforesaid application of R. W. Canfield.

The parison forming mechanism embodying structural aspects of the present invention may comprise a rotary carrier or roll 35 supported for rotation about a horizontal axis below the level at which glass from the stream or ribbon 10 is deposited on the orifice plates 1 in turn as the table 3 rotates. The roll 35 may have recesses 36 formed in its periphery for the reception of blank molds 37 which are held removably in place on the roll by suitable fastening devices, such as clamps and screws 38. The blank molds 37 protrude from the cavity 36 in the periphery of the roll 35 and are suitably spaced about the periphery of the roll so that the cavity of each blank mold is brought into register with the orifice 2 of an orifice plate, as the orifice of such plate is covered with glass from the ribbon 10, as shown in Fig. 2.

A roll 39 is supported above the glass-receiving position of each orifice plate for rotation about a horizontal axis parallel to the axis of rotation of the roll 35. The roll 39 is formed with projections 40 on its periphery. These projections 40 correspond in number and relative arrangement with the blank molds 37 on the roll 35. The rolls 35 and 39 are supported, by means to be presently described, so that the axes of rotation of the respective rolls lie in a vertical plane which passes through the center of the orifice 2 of each orifice plate at a time when the glass from the stream 10 has been deposited on such orifice plate and the orifice plate has moved to position between the peripheries of the two rolls, as shown in Fig. 2. As the orifice of the orifice plate moves into register with the cavity of a blank mold on the roll 35 and is capped from below by such blank mold, a projection 40 on the roll 39 moves into the orifice of the orifice plate and cooperates with the walls of the latter and of the cavity of the underlying blank mold to form a glass parison 41, as shown in Fig. 2. The projections 40 are suitably shaped to cooperate with the walls of the orifice 2 and of the underlying blank mold to form a parison having an initial blowing cavity, and such projections, therefore, may be termed plungers.

The rolls 35 and 39 are removably secured on reduced end portions 42 and 43 of shafts 44 and 45, respectively. The shaft 44 is journaled in a fixed bearing portion 46 of a bracket 47 which is carried by a housing 48 for a vertical shaft 49. An extension 50 of the bracket 47 above the fixed bearing 46 is formed to provide a vertical guideway 51 for a slide bearing 52 in which the shaft 45 is journaled. The slide bearing 52 rests on the upper ends of vertically adjustable screws 53 which are threaded through vertical openings 54 in the bottom of the guideway. The lower side of the slide bearing 52 may have concave depressions 55 for the reception of conical upper ends of the screws 53 so that the slide bearing 52 will be maintained firmly against angular turning movement or lateral vibration on the screws 53 by compression springs 56 which bear against the upper side of the slide bearing. The lower ends of the compression springs 56 encircle upstanding studs 57 on the slide bearing. The upper ends of the springs 56 encircle downward projections 58 on plates 59 which are disposed between the upper ends of the springs and the lower ends of adjusting screws 60. The adjusting screws 60 are threaded through vertical openings 61 in the top of the guideway and can be adjusted to vary the clamping action which the springs 56 will exert on the slide bearing. Lock nuts 62 may be provided on the adjusting screws 60 to maintain them firmly in adjusted position.

The shafts 44 and 45 carry spur gears 63 and 64, respectively, in mesh with each other, and the shaft 44 also carries a bevel gear 65 which is in mesh with a bevel gear 66 on the upper end of the shaft 49. The gears 63 and 64 are similar and, therefore, it will be apparent that rotation of the shaft 49 will cause rotation of the rolls 35 and 39 in opposite directions at the same peripheral speed. The shaft 49 will be synchronized with the means for rotating the table 3 by suitable means (not shown) which may be constructed and operated in the manner disclosed in the aforesaid application of R. W. Canfield, Serial No. 176,988.

The shafts 44 and 45 have extending end portions on which stuffing boxes 67 are mounted and are prevented from rotating with their respective shafts by co-engaging lugs 68 on such stuffing boxes or in any other suitable manner. Each of the rolls 35 and 39 is of hollow construction so as to provide an annular passage 69 therein for the circulation of a cooling medium, such as water or steam. Such cooling medium may be admitted to the passage 69 of each roll through a port 70 which communicates with a duct 71 extending through the supporting shaft. The duct 71 of each shaft communicates at its other end through a port 72 with an annular passageway 73 in the associated stuffing box 67, and such annular passageway communicates with a pipe 74 through which the cooling medium is supplied. The cooling medium, after circulating in the passage 69 in each roll escapes from that passageway through a port 75 into a duct 76 which extends longitudinally of the supporting shaft and communicates through a port 77 with an annular recess of passageway 78 in the associated stuffing box. The passageway 78 communicates with a pipe 79 through which the cooling medium may escape or be conveyed to any suitable place. The stuffing boxes are prevented from creeping longitudinally on their supporting shafts, and any suitable means may be employed for this purpose, such as a set screw 79 projecting inwardly from the stuffing box into an annular recess 80 in the periphery of the supporting shaft.

With the construction described, the rolls 35 and 39 will be effectually cooled during their operation. The roll 39 will move away from the roll 35 against the action of the springs 56 should an unyielding substance, such as a lump of stone or "frozen" glass, be fed with the molten glass between the rolls. Also, the spacing between the rolls may be adjusted slightly by adjusting the screws 53 when the slide bearing 52 is supported on such screws. The gears 63 and 64 may be replaced by gears of a slightly different size if a wider adjustment of the spacing between the rolls 35 and 39 is desired. The rolls 35 and 39 may be removed and replaced by parts generally similar thereto but adapted for different conditions of service.

The operation of the parts which have been described so far is substantially as follows—The stream 10 of molten glass falls onto each orifice plate 1 as such orifice plate is moved by the rotation of the supporting table 3 between the peripheries of the rolls 35 and 39. The rotation of the rolls 35 and 39 in the directions indicated by the arrows in Fig. 2 will cause the glass which overlies the orifice of such plate to be pressed downwardly by a plunger 40 on the roll 39 into a blank mold 37 which in the meantime has been brought to position to register with the lower end of the orifice of the orifice plate. Such glass thus is formed into a parison and the continued rotation of the rolls and the movement of the succeeding orifice plate will cause the glass of the stream adjacent to such parison to be crowded back and reduced in thickness as the succeeding orifice plate is moving to position between the peripheries of the two rolls. Consequently, the successive parisons will be connected by relatively thin strips of glass, as indicated at 81 in Fig. 2, thus reducing the amount of glass to be discarded as cullet after the finished articles have been disconnected therefrom. The blank molds may be formed of or lined with a suitable material to which the molten glass will not stick when the blank mold is relatively hot. The withdrawal of the plunger 40 from the orifice from which a parison is suspended and the concurrent withdrawal of the blank mold from such parison as the molds 35 and 39 rotate, will permit the parison to sag somewhat from the same orifice in which such parison has been formed. The connecting strips of glass between the successive parisons will prevent displacement of each parison.

As soon as the parison has sagged somewhat, the blowhead 11 will be lowered from the position shown in Fig. 1 to the position shown in Fig. 3 and a predetermined volume of air will be forced slowly through the blowhead and through the orifice 2 into the parison. Delivery of this initial quantity of air to the parison may be effected by reciprocation of the piston 20 in the cylinder 13 in the manner disclosed in the aforesaid Canfield application. During this stage in the formation of the parison, it may be carried over burners (not shown) so as to retard the elongation of the parison under the action of gravity and to increase the lateral distention of the parison under the influence of the initial blowing air.

The blow mold then is swung upwardly from the position shown in Fig. 1 to the position shown in Fig. 3 and the blow mold is closed about the suspended parison by reason of the upward movement of the rod 25. Such movement of the latter is caused by its engagement with the high portion of the cam 27. After the blow mold has closed about the parison, as shown in Fig. 3, the valve 21 is actuated to admit final blowing air for blowing the parison to final form. Before such finish blowing operation takes place, the blow mold may be rotated while still closed about the parison by reason of a torque imparted to the blow mold supporting structure through a pulley 82 from a cable 83, and this rotation of the blow mold may continue throughout the finish blowing operation, all substantially as disclosed in the aforesaid Canfield application. The remainder of the cycle of operations required for the formation and removal of a finished article of blown glassware may be as described in said prior copending application.

It is to be understood that the means for supporting the blank molds and for bringing them in turn to the proper glass-receiving position beneath an orifice plate may vary in construction, operation and arrangement without departing from the spirit and scope of the invention. For example, the blank molds may be carried on a traveling chain or like conveyor, or each blank mold may be supported on a suitably cooled arm 90 which is pivoted at 94 to the bracket 4 on the edge of the table 3, as shown in Fig. 5. The blank mold supporting arm 90 is swingable about the axis of the pivot element 94 between a raised position with its blank mold in register with the orifice of the associated orifice plate 1, as shown by the full lines in Fig. 5, and a downwardly swung position, as shown by the dotted lines in Fig. 5. A cam track 92 on which the outer end of the supporting arm 90 slides may serve to swing the arm 90 to its raised position and to permit the downward swinging movement of such arm at the proper times. When the arm 90 is in its downwardly swung position, as shown by the dotted lines in Fig. 5, it may be supported by a spring stop member 93 and it then will be out of the way of the blow mold 12 when the latter is raised to position to embrace the parison that is suspended from the associated orifice plate. When the arm 90 is in the full line position of Fig. 5, the blank mold thereon will be in position to cooperate with the walls of the orifice of the associated orifice plate and with a plunger projection 40 on the roll 39 to effect formation of a parison from glass on the orifice plate. The remaining steps for the formation of an article of blown glassware, when the construction shown in Fig. 5 is used instead of the construction shown in Fig. 2, will be substantially identical with those which have been hereinbefore set forth, and need not be repeated.

I claim:

1. Apparatus for shaping hollow glassware, comprising a supporting means movable in a closed path at least a portion of which is substantially horizontal, said supporting means having a substantially vertically opening orifice therein and being adapted to receive a strip of hot plastic glass supplied thereto when said supporting means is in the horizontal portion of its path, said strip being received in a position such that a portion thereof overlies said orifice, whereby said portion may sag through said orifice by gravity, a blank mold adapted to support glass descending through said orifice, means for moving said blank mold to and from its glass supporting position with respect to said orifice, a pressing plunger movable into said orifice from above, means for moving said plunger to cause it to press the glass in said orifice and said blank mold without severing the glass in said orifice from the parent body of said strip and thereafter to cause said plunger to move away from its positions in contact with the glass, a blow mold, means for thereafter moving said blow mold to enclose the shaped glass depending through said orifice, and a blowhead independent of said pressing plunger to expand such depending glass to final form within said blow mold while the body of glass within the blow mold remains integral with the parent body of said strip.

2. Apparatus for the manufacture of hollow glassware, comprising a plurality of supports mounted for movement in a horizontal plane and each having an orifice therein, said supports being adapted successively to receive successive portions of a continuous ribbon of glass and to support such glass in position to cover said orifices, a roll mounted above the path of movement of said supports, said roll being rotatable about a horizontal axis and having spaced projections on its periphery brought successively to position to force glass of said ribbon downwardly in the orifices of said supports as said roll rotates and the glass supports move successively to a position beneath the roll, and means for bringing a blank mold to a glass receiving position beneath the orifice of each support as that support moves to its said position beneath said roll.

3. Apparatus for the manufacture of hollow glassware, comprising a plurality of supports mounted for movement in a horizontal plane and each having an orifice therein, said supports being adapted successively to receive successive portions of a continuous ribbon of glass and to support such glass in position to cover said orifices, a roll mounted above the path of movement of said supports, said roll being rotatable about a horizontal axis and having spaced projections on its periphery brought successively to position to force glass of said ribbon downwardly in the orifices of said supports as said roll rotates and the glass supports move successively to a position beneath the roll, a second roll below the path of movement of said supports, said last named roll being rotatable about a horizontal axis, and blank molds carried by said second named roll in position to be brought successively to position to receive glass at the lower end of the orifice of the glass support below the first named roll.

4. Apparatus for the manufacture of hollow glassware, comprising a plurality of supports mounted for movement in a horizontal plane and each having an orifice therein, said supports being adapted successively to receive successive portions of a continuous ribbon of glass and to support such glass in position to cover said orifices, a roll mounted above the path of movement of said supports, said roll being rotatable about a horizontal axis and having spaced projections on its periphery brought successively to position to force glass of said ribbon downwardly in the orifices of said supports as said roll rotates and the glass supports move successively to a position beneath the roll, a plurality of pivoted arms, a blank mold carried by each arm, and means for supporting and operating said arms so as to bring the blank mold on each arm to a glass receiving position below the orifice of one of said supports when the support is in its said position below said roll.

5. Apparatus for shaping hollow glassware comprising a plurality of plates mounted for movement in a horizontal plane and each having an orifice therein, said plates being adapted successively to receive a ribbon of glass extending over said orifices, a rotatable roll having plungers spaced about its periphery, each adapted to enter an orifice of one of said plates, a second rotatable roll having blank molds on its periphery each adapted to cap the lower end of the orifice of one of said plates, means for mounting said first named roll above the path of movement of said plates and said second named roll below the path of movement of said plates and directly beneath said first named roll, said mounting being adapted yieldingly to permit upward movement of said first named roll, and means for rotating said rolls in unison.

6. Apparatus for shaping hollow glassware comprising a plurality of plates mounted for movement in a horizontal plane and each having an orifice therein, said plates being adapted successively to receive a ribbon of glass extending over said orifices, a rotatable roll having plungers spaced about its periphery, each adapted to enter an orifice of one of said plates, a second rotatable roll having blank molds on its periphery each adapted to cap the lower end of the orifice of one of said plates, means for mounting said first named roll above the path of movement of said plates and said second named roll below the path of movement of said plates and directly beneath said first named roll, and means for adjusting said first named roll vertically.

7. Apparatus for shaping hollow glassware comprising a plurality of plates mounted for movement in a horizontal plane and each having an orifice therein, said plates being adapted successively to receive a ribbon of glass extending over said orifices, a rotatable roll having plungers spaced about its periphery, each adapted to enter an orifice of one of said plates, a second rotatable roll having blank molds on its periphery each adapted to cap the lower end of the orifice of one of said plates, means for mounting said first named roll above the path of movement of said plates and said second named roll below the path of movement of said plates and directly beneath said first named roll, and means for cooling said rolls during the operation thereof.

8. Apparatus for the manufacture of hollow glassware, comprising supporting means mounted for movement in a horizontal plane and having a plurality of orifices therein, said supporting means being adapted to receive a continuous ribbon of glass in position to overlie said orifices, means for moving said supporting means continuously, a roll mounted above the path of movement of said supporting means for rotation about a horizontal axis which is disposed substantially at right angles to the path of movement of said supporting means adjacent to said roll, means to drive said roll at a speed coordinated with the speed of movement of said supporting means, said roll having a plurality of spaced projections on its periphery corresponding in spacing to the spacing of said orifices, means for supporting said roll at a distance above said supporting means such that a material portion of the glass of said ribbon is forced downward through said orifices by the projections of said roll and the glass on said supporting means intermediate and around said orifices is flattened to a thickness less than the thickness of said ribbon, and means for expanding the glass pressed through said orifices by the projections on said roll into hollow glass articles while still integral with the flattened portion of said ribbon.

Signed at Hartford, Connecticut this 25th day of April, 1928.

THOMAS WAUGH, Jr.